Aug. 11, 1953  H. J. PALUMBO  2,648,618
CLUTCH FACING AND METHOD OF MANUFACTURE
Filed Aug. 31, 1948
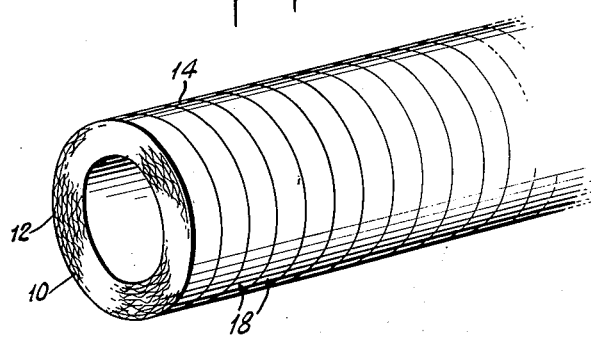
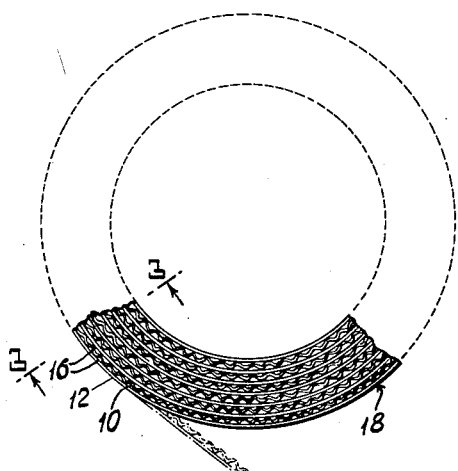
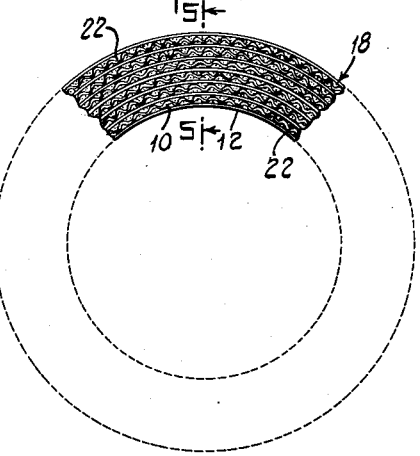
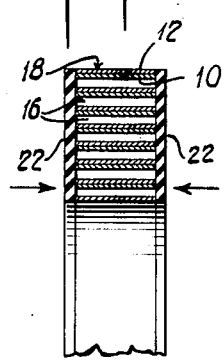
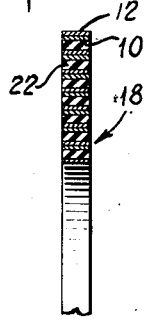
INVENTOR
HENRY J. PALUMBO.
BY
ATTORNEY

Patented Aug. 11, 1953

2,648,618

UNITED STATES PATENT OFFICE 2,648,618

CLUTCH FACING AND METHOD OF MANUFACTURE

Henry J. Palumbo, Somerville, N. J., assignor to Johns-Manville Corporation, New York, N. Y., a corporation of New York Application August 31, 1948, Serial No. 47,015

5 Claims. (Cl. 154—81)

This invention relates to an improved heat and wear resistant vulcanized disc and method of making the same, and is particularly concerned with an improved flat vulcanized disc of annular shape adapted for use as a clutch facing.

The flat vulcanized disc of the present invention consists structurally of a reinforcing element comprising a composite corrugated asbestos paper laminate including a flat backing sheet and a corrugated sheet, said reinforcing element being disposed in convolute form throughout the body of the disc with the paper sheets and corrugation apertures perpendicular to the flat faces of the disc, the corrugation apertures being filled by a vulcanized binder compound including wear resistant filler particles embedded in a heat hardened gum or gel binder.

The strong wear resistant vulcanized flat discs herein described are related in general structure to similar articles previously proposed in which alternate layers of vulcanized binder material and reinforcing fabric are assembled into a convoluted bonded disc. The method of manufacture also resembles the prior practice of assembling an asbestos paper or fabric reinforcing member as a convolutely wound tube with interposed layers of a vulcanizable binder saturant, and pressure vulcanizing the assembled unit.

A primary object of the present invention is that of providing flat vulcanized discs having exceptional structural strength and durability such as to adapt them for use as clutch facings and the like.

Another object is to provide an economical and simple method of manufacturing such discs in a manner which insures uniformity of wear resistance and strength throughout each unit surface area of the finished product.

A particular object is to provide a flat vulcanized disc of annular shape having an improved strength imparting arrangement of reinforcing elements and vulcanizable binder filler which lends itself to a simple and economical method of manufacture.

With the above objects in view, the invention consists in the improved heat and wear resistant discs and method of manufacture which are hereinafter described and more particular defined by the accompanying claims.

In the following description reference will be made to the attached drawings, in which:

Fig. 1 is a perspective view of a tubular roll of spirally wound composite corrugated and flat asbestos paper laminate, with transverse severance lines indicated for the short tubular blanks which serve to reinforce the friction discs of the present invention;

Fig. 2 is an enlarged fragmentary view in end elevation of one of the short tubular blanks severed from the roll of spirally wound composite corrugated paper portrayed in Fig. 1;

Fig. 3 is an enlarged fragmentary transverse section of one of the short tubular reinforcing blanks, taken on the plane 3—3 of Fig. 2, such blank being shown as interposed as a sandwich core between thin sheets of vulcanizable friction material, preparatory to hot press consolidation;

Fig. 4 is a fragmentary face view of an annular vulcanized friction disc constructed according to the present invention; and Fig. 5 is an enlarged fragmentary transverse section taken on the plane 5—5 of Fig. 4.

Referring to the drawings, one satisfactory procedure for making the composite corrugated sheet element of the annular disc clutch facings therein portrayed is as follows: A thin paper sheet 10 (Fig. 2) of asbestos fiber or equivalent heat resistant mineral fiber sheet is corrugated by passing it through the bite of a pair of cooperating corrugating rolls in which the corrugations extend transversely to the length of the sheet. A flat sheet 12 is applied as a backing sheet to the corrugated facing by means of a small amount of phenol-formaldehyde or other suitable thermosetting or thermoplastic binder to form a composite corrugated laminate. The composite sheet is then oven dried to liberate any solvent that might be present.

The composite corrugated paper sheet thus formed is wrapped spirally about a forming mandrel to produce a tubular element 14 (Fig. 1). The forming mandrel should have a diameter slightly greater than the diameter of the aperture in the annular clutch facing which is finally produced. The number of laps of composite corrugated sheets which are built up by spiral wrapping on the mandrel may vary substantially, bearing in mind that the wall thickness of the resulting tubular element 14 is preferably limited to slightly less than the corresponding dimension of the mold within which the annular clutch facing is finally given its heat and pressure vulcanizing cure. The tubular roll 14 is oven dried at a temperature of 125° F. and then impregnated with a 30% solution of phenol-formaldehyde resin in alcohol. The thus impregnated roll is then dried for several hours at a temperature of 120° F. to vaporize the alcohol solvent.

After forming the tubular member 14 with multiple corrugation apertures 16 extending longitudinally thereof, the next step is that of transversely severing such member 14 at uniformly spaced short intervals to form short tubular blanks 18. This slicing operation may be carried out on a conventional mold slicing machine.

For producing an annular clutch facing of approximately ⅛–³⁄₁₆ inch final thickness, it has been found that the tube blanks 18 should normally be cut to a length dimension of about one inch. The next step, after forming the blanks 18, is that of inserting a blank (Fig. 3) as a sandwich core between two thin annular sheets 22 of a heat vulcanizable impregnant such as uncured natural rubber sheets incorporating the usual fillers and vulcanizers. The thick laminar sandwich thus formed is placed in a vulcanizing mold of suitable dimensions and annular form, and is compressed and cured under heat and pressure. Full heat is applied with gradual pressure increase so as to effect fusion of the uncured sheet rubber and to force the fused rubber to flow into and fill all the corrugation apertures 16 of the blank core 18. During the molding operation sufficient squeezing pressure is applied edgewise of the paper sheets as indicated by arrows, to consolidate the core 18 and its impregnant to the previously stated final thickness of ⅛–³⁄₁₆ inch. This is a proportional thickness consolidation of about 8–10 to 1 on the original sandwich. It is preferred that the cross sectional shape and dimensions of the blank 18 correspond substantially with those of the mold, so that there will be no substantial distortion of the original corrugation structure of the reinforcing sheets within the final pressed clutch facing as shown in Figs. 4 and 5.

A suitable formula for the heat hardenable filler sheet 22 for the clutch facing is the following:

|                          | Per cent |
|--------------------------|---------|
| Smoked rubber sheet      | 11.3    |
| Reclaimed rubber         | 10.6    |
| Pulverized lead          | 6.9     |
| Channel carbon black     | 10.5    |
| Sulfur                   | 5.9     |
| Barytes                  | 29.7    |
| Fine and coarse litharge | 22.6    |
| Liquid phenol-formaldehyde | 2.5   |

It will be understood that the sheets 22 of filled rubber of the indicated composition are normally produced from a solvent reduced liquid form by a conventional rubber sheeting operation employing forming rolls.

The uncured rubber sheets 22 employed in the final impregnating and vulcanizing step may incorporate other friction imparting filler materials than those named, such as, for example, particles of copper or brass, or particles of cork.

As an alternative to the method above described, in which the spirally wrapped corrugated blanks 18 are inserted between filled uncured rubber sheets 22 for impregnation and vulcanization within the mold, it is also possible to fill the corrugation apertures of the blanks 18 with suitable heat vulcanizable binder in solid finely pulverized form. For example the corrugation apertures in blanks 18 may be filled with a suitable finely pulverized mixture of uncured rubber, carbon black, litharge, sulfur and metal particles at the time of insertion in the mold, and the mold then gradually closed to effect fusion and final vulcanization while compressing the thus filled blank to the final desired dimensions.

According to a preferred method of making the present clutch facings, a standard composite corrugated asbestos paper is used in which a single plain backing sheet is adhered to a corrugated facing sheet by means of a small amount of water glass binder and sizing. This standard composite corrugated paper may be wrapped spirally about a forming mandrel to produce a tubular roll 14 having an inside diameter of 6³⁄₃₂ inches and an outside diameter of about 9³⁄₁₆ inches. This tubular roll is oven dried at a temperature of 125° F. and then impregnated with a 30% solution of phenol-formaldehyde resin in alcohol. The thus impregnated roll of paper is then dried for several hours at a temperature of 120° F. to vaporize the alcohol solvent. The thus stiffened tubular roll of corrugated paper is transversely cut into blanks 18 of one inch length.

A vulcanizable rubber impregnating compound of approximately the composition set forth in the preceding formula is milled to sheet form on a rubber mill, after adding thereto about 20% of brass chips. The thus milled and sheeted compound is die-cut to annular sheets 22 of about .045 inch thickness having an inside diameter of about 6³⁄₃₂ inches and an outside diameter of about 9³⁄₁₆ inches.

One of the annular thin sheets of rubber compound is placed on the bottom of a hot press mold, and one of the one inch long blanks of rolled corrugated paper is then placed in the mold. Another annular sheet of the rubber compound is then placed on top of the annular paper blank, thereby sandwiching the paper blank between two layers of the vulcanizable rubber compound. The mold is then slowly closed while under the heat of 90 lbs. steam circulating through the heating chamber thereof, and the cure is effected by a ten minute heating period. Sufficient pressure is applied to the mold to reduce the thickness of the sandwich from about 1.09 inches to about .185 inch. The annular clutch rings are then cured in stacks under weights in a baking oven, in a curing cycle which includes about five hours heating at a temperature of 300° F., with an additional hour in raising the temperature gradually to the 300° F. baking temperature at the beginning of the cure cycle. The faces of the resulting clutch facings may be finally ground to a thickness of about .135 inch. The resulting clutch facings incorporate by weight approximately 35–40% of asbestos paper, 4–8% stiffening phenolic resin, 40–50% filled vulcanized rubber compound, and about 10–12% brass chips.

A clutch facing of high paper-high resin composition can be made by placing the resin impregnated corrugated asbestos paper blank in the mold and filling its voids with a finely divided mixture of cork dust and powdered heat curable phenolic resin. The thus filled corrugated paper blanks are then hot press consolidated and cured for a period of about ten minutes in a press supplied with 90 lbs. pressure heating steam to thereby reduce the blanks to a final thickness, after face grinding, of about .145 inch. The resulting clutch facing discs may comprise by weight about 60% of asbestos fiber, about 11% of saturated phenolic resin in the paper as a paper reinforcing, and about 29% of a mixture of cork and phenolic resin as the friction filler material for the corrugation apertures.

One of the important factors in imparting greater physical strength to the vulcanized disc clutch facings is that the corrugated asbestos paper reinforcing is so greatly stiffened by means of the relatively small amount of synthetic resin impregnant as to retain its corrugation shape in the highly consolidated and cured product. By reason of the presence of this resin stiffened corrugated paper disposed in convolute form throughout the entire body of the clutch facing disc, the resulting disc has at least 25% higher hot spin strength and even greater uniform wear resistance, as compared to any previously known clutch facing disc of convoluted asbestos paper reinforced clutch facing of otherwise comparable chemical composition.

Corrugated asbestos fiber reinforced clutch facings made in accordance with the present invention, with about 40-50% vulcanized rubber compound filling the corrugation pores, exhibited under standard tests an average rate of wear of .0029-.0033 cu. in./hp.-hr., and a hot spin rupture strength of 10,900-11,133 R. P. M. The rate of wear test was carried out at a temperature of 350° F. against a cast iron wear plate under a load pressure of 50 lbs./sq. in. at a surface speed of 10.5 ft./sec., over a three hour period. The values given are those obtained by subjecting many samples to successive rate of wear tests under the above stated conditions. The average coefficient of friction of these test samples was 0.52. The spin rupture strength is expressed as the speed at which sample friction discs of ⅛ inch thickness were spun while supported horizontally by a plate in a turbine tester at a temperature of 500° F., at the moment of initial rupture or break of the discs.

The invention which has been thus described by detailed example is not limited as to such details and it is to be understood that variations, changes and modifications are contemplated within the scope of the invention as dfined by the following claims.

What I claim is:

1. A flat vulcanized disc having high strength and wear resistant properties comprising a composite corrugated asbestos paper reinforcing strip disposed in convolute form with the paper and filled corrugation apertures extending throughout the body of the disc edgewise to the flat plane surfaces of said disc, said composite paper strip including a flat backing sheet and a corrugated sheet of thin asbestos paper adhered together as a laminate, a stiffening impregnant for the paper sheets, and a strength and durability imparting filler for the corrugation apertures, said filler comprising comminuted friction material embedded in a heat hardened binder.

2. An annular friction disc adapted for use as a clutch facing comprising alternate reinforcing strips of plain and corrugated thin asbestos paper, said strips being impregnated with a stiffening binder and spirally wound in lapped abutting relation to form a cylinder with the corrugation apertures extending longitudinally of the cylinder walls, said corrugation apertures being filled with a hardened cementitious binder and friction particles distributed throughout said binder, and said strips and the filled corrugation apertures being perpendicular to the wearing face of the clutch facing and exposed thereto.

3. The method of forming an annular friction disc adapted for use as a clutch facing which comprises, assembling flat and corrugated sheets of heat resisting asbestos paper impregnated with a stiffening and strength imparting binder in composite strips with the corrugations extending transversely thereof, spirally winding each strip in the form of a tubular element, forming a sandwich with a transverse section of one of said elements as a core between facing sheets of heat fusible hardenable binder incorporating friction imparting filler particles, subjecting said sandwich to heat to fuse the binder and compressing it in a direction forcing said fused and filled binder into the corrugation pores, and hardening the product to form a disc with the paper strips and binder filled corrugation pores extending perpendicularly to the wearing face of the clutch facing and exposed thereto.

4. The method of forming strong durable flat discs which comprises, transversely corrugating a sheet of asbestos paper, assembling with said sheet a flat backing sheet to form a composite corrugated sheet laminate, impregnating said sheets with a solvent reduced heat hardenable resin and partially heat curing the resin, wrapping said composite sheet laminate spirally in lapping convolute layers to form a tubular unit having many small longitudinal corrugation apertures, transversely dividing the tubular unit into short molding blank sections, forming a sandwich with one of said sections as a core between thin facing sheets of vulcanizable friction material, and hot pressing said sandwich with gradual application of pressure to fuse and flow said friction material into the corrugation pores of the sandwich core and to consolidate the product to a thin disc in which friction material filled corrugation cores extend perpendicularly to the major faces of the disc, and heat vulcanizing the product.

5. The method of forming an annular friction disc adapted for use as a clutch facing which comprises, assembling flat and corrugated sheets of heat resisting mineral fibers in composite strips and impregnating said sheets with a stiffening and strength imparting binder, spirally winding each strip in the form of a tubular element with the corrugations extending longitudinally thereof, filling the corrugation pores of a short transverse section of one of said tubular elements with a hardenable binder incorporating friction imparting filler particles, and strongly hot pressing the resulting tubular element in a direction longitudinally of its major axis to form a thin dense disc having the strips and the binder filled corrugation pores extending perpendicularly to its wearing face.

HENRY J. PALUMBO.

References Cited in the file of this patent

UNITED STATES PATENTS

| Number | Name | Date |
|---|---|---|
| 1,386,722 | Mather | Aug. 9, 1921 |
| 2,136,370 | Bockius et al. | Nov. 15, 1938 |
| 2,150,937 | Novak | Mar. 21, 1939 |
| 2,221,006 | Romanoff | Nov. 12, 1940 |
| 2,225,081 | O'Hare | Dec. 17, 1940 |
| 2,253,316 | Armitage | Aug. 19, 1941 |